(12) United States Patent
Won et al.

(10) Patent No.: US 8,538,446 B2
(45) Date of Patent: Sep. 17, 2013

(54) METHOD AND APPARATUS FOR ALLOCATING CELL ID IN SELF-ORGANIZING NETWORK

(75) Inventors: Jeong-Jae Won, Hwaseong-si (KR); Abhishek Roy, Suwon-si (KR); Seung-Cheol Mun, Yongin-si (KR); Dong-Seop Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 12/807,600

(22) Filed: Sep. 9, 2010

(65) Prior Publication Data
US 2011/0059744 A1  Mar. 10, 2011

(30) Foreign Application Priority Data
Sep. 10, 2009  (KR) .................. 10-2009-0085253

(51) Int. Cl.
*H04W 72/00* (2009.01)
(52) U.S. Cl.
USPC ...................................... 455/450; 455/456.1
(58) Field of Classification Search
USPC .................. 455/450, 456.1, 456.4; 370/338
See application file for complete search history.

(56) References Cited

U.S. PATENT DOCUMENTS

2008/0025274 A1* 1/2008 Cheng et al. .................. 370/338

* cited by examiner

*Primary Examiner* — Sam Bhattacharya

(57) ABSTRACT

A method and an apparatus allocate a cell identifier in a self-organizing network. A database stores and obtains position information of a plurality of femto base stations. A Physical Cell Identifier (PCID) reconfiguring unit configures an initial Merge Table (MT) including allocation information of a PCID based on the position information of the femto base station and minimizes the number of rows or columns according to at least one permutation set in the initial MT.

40 Claims, 10 Drawing Sheets

METHOD AND APPARATUS FOR ALLOCATING CELL ID IN SELF-ORGANIZING NETWORK

CROSS-REFERENCE TO RELATED APPLICATION(S) AND CLAIM OF PRIORITY

The present application is related to and claims the benefit under 35 U.S.C. §119 to an application filed in the Korean Intellectual Property Office on Sep. 10, 2009 and assigned Serial No. 10-2009-0085253, the contents of which is herein incorporated by reference.

TECHNICAL FIELD OF THE INVENTION

The present invention relates to a method and an apparatus for allocating a cell Identifier (ID) in a self-organizing network. More particularly, the present invention relates to a method and an apparatus for allocating a dynamic Physical Cell ID (PCID) using a Merge Table (MT) representing a relation between a femto base station and a PCID.

BACKGROUND OF THE INVENTION

As a femto cell and the next generation technique are applied in a mobile communication system field, an interest for a Self-organizing Network (SoN) including an automation function such as self-configuration or self-optimization is drawing attention.

Meanwhile, currently, the SoN network is discussed at a 3rd Generation Partnership Project (3GPP) Long Term Evolution (LTE) standard and an Institute of Electrical and Electronics Engineers (IEEE) 802.16 standard.

FIG. 1 illustrates an LTE system whose standardization is in progress at a 3GPP according to the conventional art.

Referring to FIG. 1, to extend high-speed data transmission and coverage, a plurality of femto cells exist inside a macro cell 100. The femto cell denotes a small mobile communication base station (referred to as a femto base station hereinafter) that accesses a mobile communication core network via a broadband network installed in an indoor space such as a household and an office (or a femto cell may directly access an existing mobile communication network). That is, the femto base station denotes a base station that can provide coverage of less than 10 meters in cell radius.

As basic functions required for the femto cell, a self-configuration function of self-generating installation parameters that depend on a configuration inside a base station when additionally installing the base station, identifying a neighbor base station, setting/registering a relation, and setting connection with a core network at an initial automatic installation and pre-operation process, and a self-optimization function of controlling a base station signal strength by utilizing an inter-neighbor base station signal and traffic type information and optimizing a handover parameter should be provided.

Meanwhile, femto cells are connected with a Mobility Management Entity (MME) 102 or 104 sequentially connected with a SoN server 130 via a gateway 120. The SoN server 130 controls a self-configuration function and a self-optimization function.

In addition, the femto cell is divided into a PCID. Assuming that the number of provided PCIDs is n, n is equal to or less than the number (m) of actual femto cells. Therefore, the same PCID needs to be allocated to femto cells inside the macro cell 100.

The PCID allocation has to be "collision free" and "confusion free". The collision free allows the same PCID not to be allocated to neighbor femto cells because the femto cells that use the same PCID may collide with one another when the femto cells that use the same PCID are adjacent to one another. The confusion free allows the same PCID not to be allocated to neighbor femto cells of a femto cell to be additionally installed because a terminal may confuse the neighbor femto cells during a handover procedure when a new femto cell is installed and the neighbor femto cells of the femto cell to be installed use the same PCID.

Therefore, a method and an apparatus for efficiently allocating a PCID with such that it is collision free and confusion free in a SoN are required.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method and an apparatus for allocating a PCID in a self-organizing network.

Another aspect of the present invention is to provide a method and an apparatus for configuring a Merge Table (MT) for allocating a PCID in a self-organizing network.

Still another aspect of the present invention is to provide a method and an apparatus for updating an MT as a femto cell increases in a self-organizing network.

In accordance with an aspect of the present invention, a method for configuring a Merge Table (MT) for allocating a cell identifier in a self-organizing network is provided. The method includes obtaining position information of a plurality of femto base stations and configuring an initial MT including allocation information of a Physical Cell Identifier (PCID) based on the position information of the femto base station. The method also includes minimizing the number of rows or columns according to at least one permutation in the initial MT.

In accordance with another aspect of the present invention, a method for allocating a cell identifier in a self-organizing network is provided. The method includes, when topology by a new femto cell changes, determining whether to optimize cell identifier allocation. When optimizing the cell identifier allocation, a Physical Cell Identifier (PCID) is allocated using a Merge Table (MT). And when not optimizing the cell identifier allocation, one of available PCIDs is selected and allocated.

In accordance with still another aspect of the present invention, an apparatus for configuring a Merge Table (MT) for allocating a cell identifier in a self-organizing network is provided. The apparatus includes a database for obtaining and storing position information of a plurality of femto base stations. The apparatus also includes a Physical Cell Identifier (PCID) reconfiguring unit for configuring an initial MT including allocation information of a Physical Cell Identifier (PCID) based on the position information of the femto base station and minimizing the number of rows or columns according to at least one permutation in the initial MT.

In accordance with yet another aspect of the present invention, an apparatus for allocating a cell identifier in a self-organizing network is provided. The apparatus includes a controller for, when topology by a new femto cell changes, determining whether to optimize cell identifier allocation. The apparatus also includes a Physical Cell Identifier (PCID) selector for allocating a PCID using a Merge Table (MT)

when optimizing the cell identifier allocation, and selecting and allocating one of available PCIDs when not optimizing the cell identifier allocation.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will be more apparent from the following description when taken in conjunction with the accompanying drawings in which.

DETAILED DESCRIPTION OF THE INVENTION

FIGS. 2 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and an apparatus for allocating a PCID at a SoN.

Figure 1:
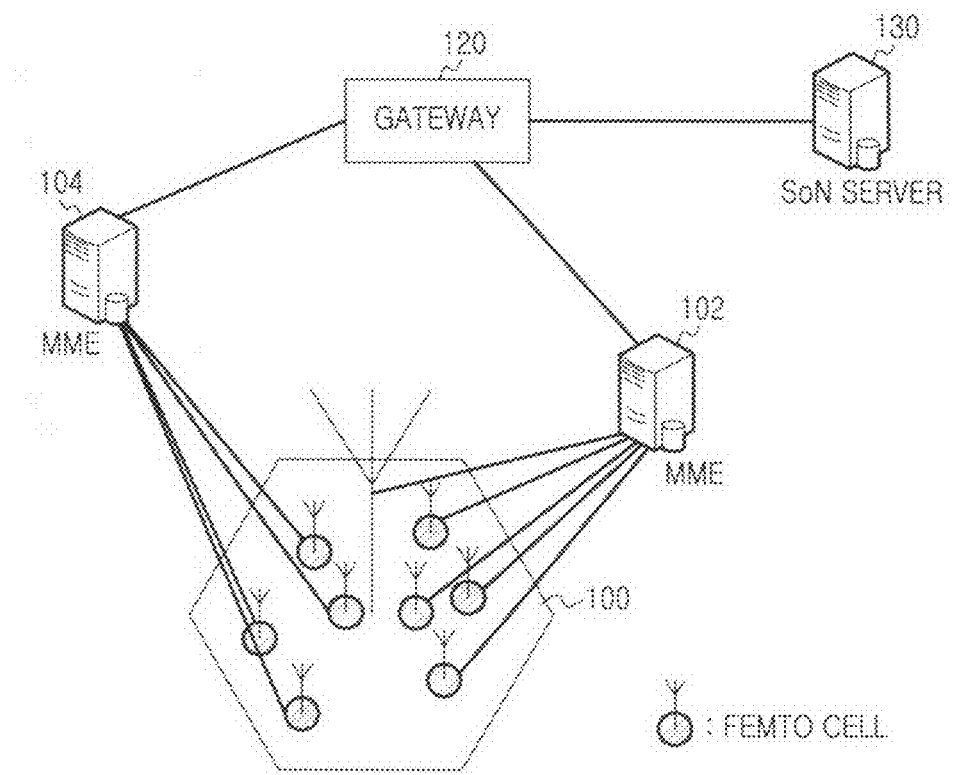
FIG. 1 illustrates an LTE system according to the present disclosure.
Figure 2:
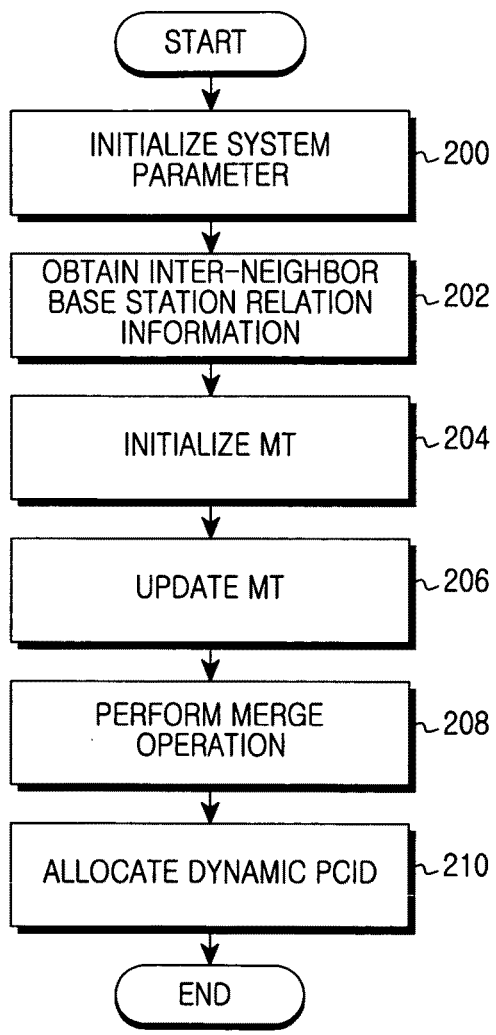
FIG. 2 illustrates a process for generating an MT for dynamically allocating, at a SoN, a PCID according to an embodiment of the present invention.

FIG. 2 illustrates a process for generating a Merge Table (MT) for dynamically allocating, at a SoN, a PCID according to an embodiment of the present invention.

Referring to FIG. 2, the SoN server initializes system parameters required for a self-configuration function or a self-optimization function of a femto base station in block 200.

The SoN server obtains inter-neighbor base station relation information for configuring an initial MT in block 202. The inter-neighbor base station relation information is used for determining PCIDs to be allocated to a plurality of femto base stations based on automatic neighbor relation and inter-femto base station distance information or reception strength information. For example, when an n-th PCID is allocated to a first femto base station, an m-th PCID instead of the n-th PCID is allocated to a second femto base station adjacent to the first femto base station. Depending upon the situation, a third femto base station adjacent to the second femto base station may be a neighbor femto base station of the first femto base station, and so a different PCID excluding the n-th PCID is allocated to the third femto base station. From inter-neighbor base station relation information, different PCIDs are allocated to neighbor femto base stations of a relevant femto base station, but when a distance between femto base stations is far away, the same PCID may be reallocated to the femto base stations. For example, when a distance between the first femto base station and the third femto base station is greater than a threshold, the same PCID may be allocated to the first femto base station and the third femto base station.

The inter-femto base station distance information is based on Global Positioning System (GPS) position information of a femto base station reported to the SoN server by each femto base station.

The SoN server initializes an MT based on the inter-neighbor base station relation information in block 204. The MT is defined by relation between a PCID index and a femto base station index, and represents PCID information allocated to a relevant femto base station. The MT initialization is described with reference to FIG. 6.

The SoN server updates an initial MT using a virtual cell in block 206. The initial MT is updated using the virtual cell because, when a femto base station is additionally installed in a virtual cell area (that is, a femto base station is additionally installed between cells that use the same PCID), a confusion problem may occur between cells that use the same PCID. The initial MT is updated to reflect this confusion into the MT. The MT update is described with reference to FIG. 7. Depending on realization, block 206 may be omitted in some embodiments.

The SoN server merges rows according to a predetermined rule in order to reduce the number of rows (that is, PCID indexes) of the updated MT in block 208. This operation is referred to as a merge operation hereinafter. The merge operation is described with reference to FIG. 9. Here, the number of allocated PCIDs may be reduced by reducing the number of rows of the MT. Consequently, PCID sets in use and available PCID sets are configured from rows (PCID indexes) of the MT merged according to the predetermined rule.

In the following description, blocks 202 to 208 are referred to as a Permutation Merge Model with Guided Random Search (PMM-GRS) algorithm.

The SoN server performs a dynamic PCID allocation using an MT generated by the PMM-GRS algorithm in block 210. The dynamic PCID allocation is described in more detail with reference to FIGS. 3 and 4.

After that, the SoN server ends the procedure according to an embodiment of the present invention.

Figure 3:
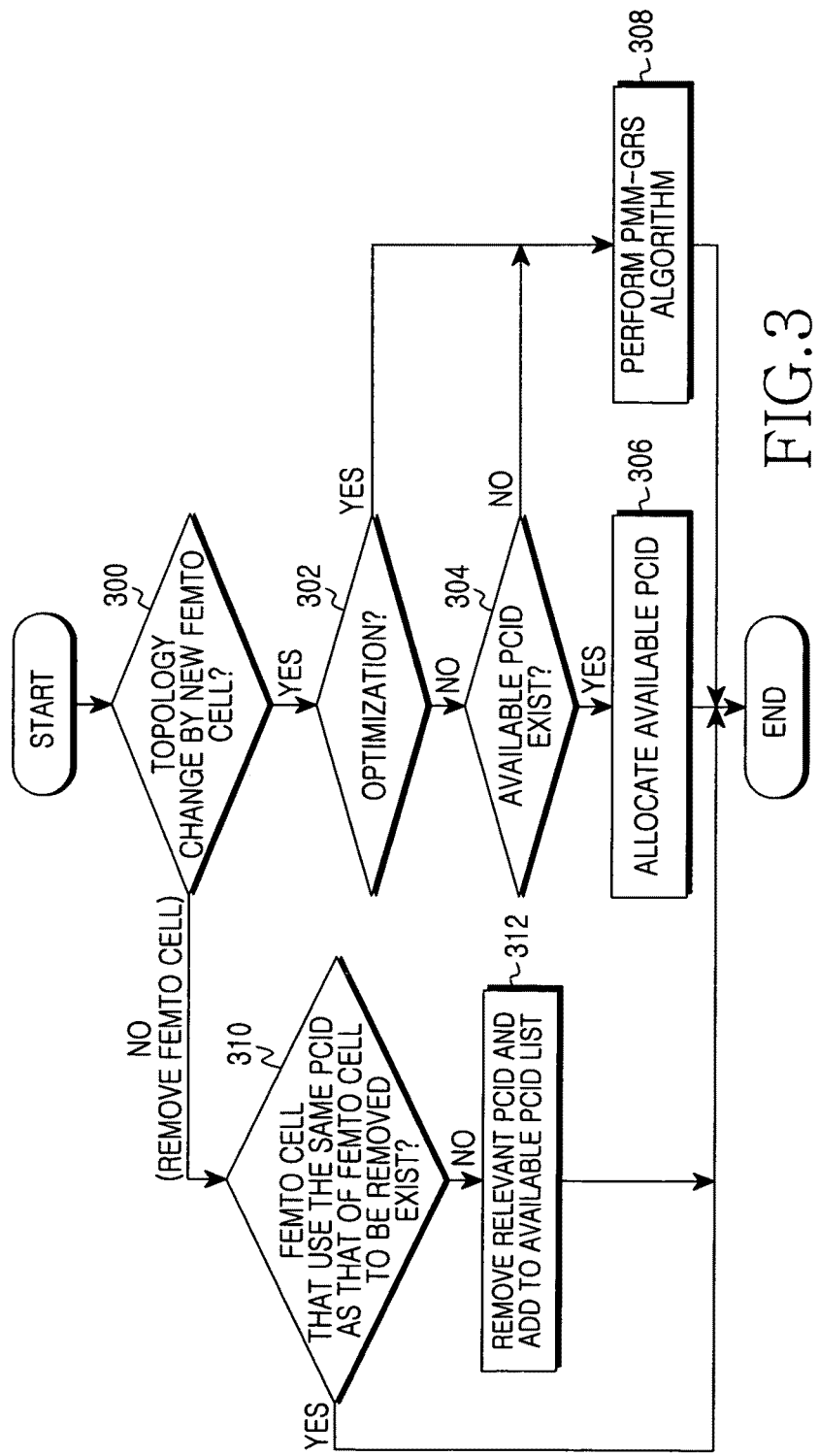
FIG. 3 illustrates a process for allocating a dynamic PCID at a SoN according to an embodiment of the present invention.

FIG. 3 illustrates a process for allocating a dynamic PCID at a SoN according to an embodiment of the present invention.

Referring to FIG. 3, the SoN server determines whether a topology is changed by a new femto cell or a new femto base station in block 300. That is, the SoN server determines whether a new femto base station is additionally installed inside a relevant macro cell by a user. According to the topology change, the SoN server may recognize the additionally installed femto base station through a relevant process procedure (e.g., an access procedure) between the SoN server and the new femto base station.

The SoN server determines whether to optimize a PCID set to be allocated according to the topology change by the new femto cell in block 302. When determining to optimize the PCID set (set of PCID indexes, which are rows of an MT), the SoN server performs the PMM-GRS algorithm to optimize the PCID set in block 308. The PMM-GRS algorithm initializes the MT, updates the MT, and merges rows of the updated MT with consideration of PCID reuse.

When the optimization of the PCID set to be allocated is not required, the SoN server determines whether available PCIDs exist from the present PCID set (or rows of a present MT) in block 304. When the available PCIDs exist, the SoN server allocates an available PCID from the present PCID set to be allocated to a femto base station in block 306.

When there is no PCID available in block 304, the SoN server performs the PMM-GRS algorithm to generate an optimized MT in block 308. The MT optimized by the PMM-GRS algorithm includes PCID allocation information of the newly installed femto base station.

When the topology is not changed by the new femto cell (that is, at least one femto cell is removed from a relevant macro cell) in block 300, the SoN server determines whether there is a femto cell that uses the same PCID as that of a femto cell to be removed in block 310.

When there is the femto cell that uses the same PCID as that of the femto cell to be removed, the SoN server maintains the present state.

In contrast, when there is no femto cell that uses the same PCID as that of the femto cell to be removed, the SoN server removes the PCID of the femto base station to be removed from the present PCID set and adds the removed PCID to an available PCID list.

Depending upon realization, when the topology is not changed by the new femto cell (that is, at least one femto cell is removed from a relevant macro cell) in block 300, the SoN server may perform the PMM-GRS algorithm to optimize a PCID set.

Figure 4:
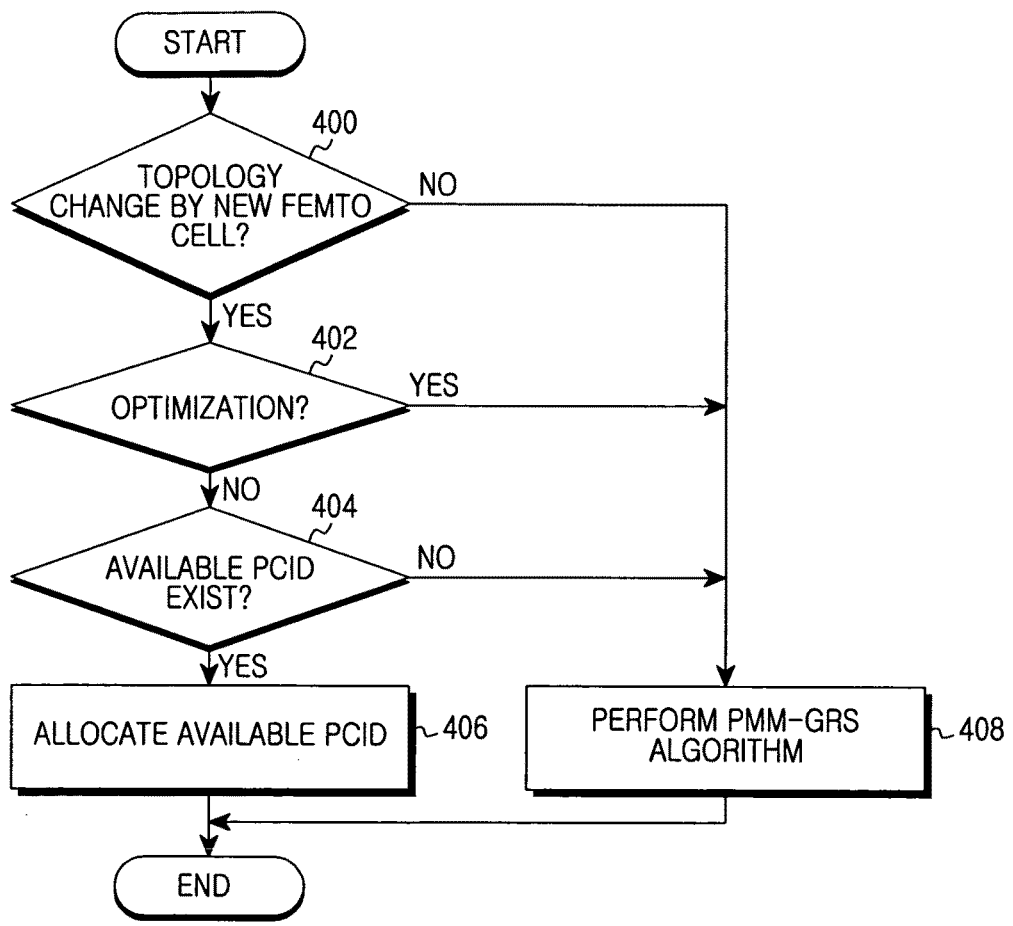
FIG. 4 illustrates a process for allocating a dynamic PCID at a SoN according to an embodiment of the present invention.

FIG. 4 illustrates a process for allocating a dynamic PCID at a SoN according to an embodiment of the present invention.

Referring to FIG. 4, the SoN server determines whether a topology is changed by a new femto cell or a new femto base station in block 400. That is, the SoN server determines whether a new femto base station is additionally installed inside a relevant macro cell by a user.

The SoN server determines whether to optimize a PCID set according to the topology change by the new femto cell in block 402. When determining to optimize the PCID set, the SoN server performs the PMM-GRS algorithm to optimize the PCID set in step 408.

When the optimization of the PCID set to be allocated is not required, the SoN server determines whether available PCIDs exist from the present PCID set in block 404. When the available PCIDs exist, the SoN server allocates an available PCID from the present PCID set to be allocated to a femto base station in block 406.

When no available PCID exists in block 404, the SoN server performs the PMM-GRS algorithm to generate an optimized MT in block 408. The MT optimized by the PMM-GRS algorithm includes PCID allocation information of the newly installed femto base station.

When the topology is not changed by the new femto cell (that is, at least one femto cell is removed from a relevant macro cell) in block 400, the SoN server performs the PMM-GRS algorithm in block 408.

Figure 5:
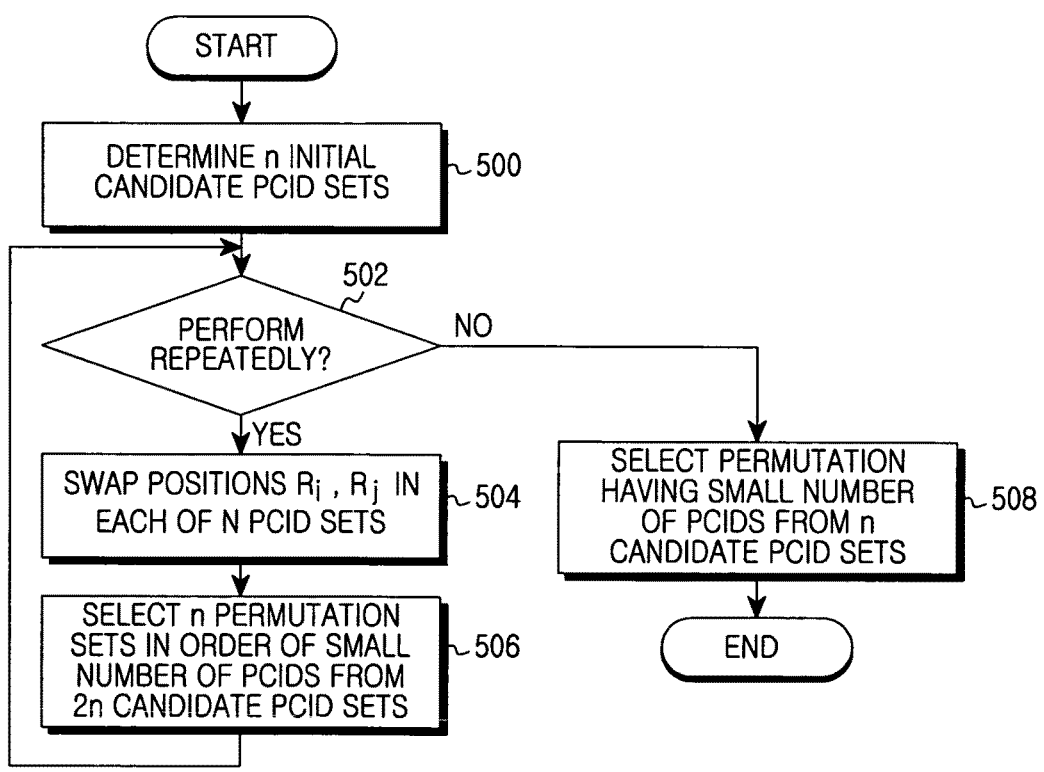
FIG. 5 illustrates a process for performing a merge operation at a SoN according to an embodiment of the present invention.

FIG. 5 illustrates a process for performing a merge operation at a SoN according to an embodiment of the present invention. The merge operation is performed to configure an optimized PCID set.

Referring to FIG. 5, the SoN server determines n candidate PCID sets according to n initial permutations with respect to rows of an updated MT in block 500.

The SoN server determines whether to repeatedly perform in block 502. When determining to repeatedly perform, the SoN server swaps positions $R_i$ and $R_j$ at respective n candidate PCID sets in block 504. Here, $R_i$ and $R_j$ denote an i-th element and a j-th element of a PCID set, respectively. Depending on realization, positions of m elements of the PCID set may be swapped. m is an integer less than n. Here, a total of 2n candidate PCID sets including n candidate PCID sets before the positions $R_i$ and $R_j$ are swapped and n candidate PCID sets after the positions $R_i$ and $R_j$ are swapped exist.

As a frequency of repeated performance increases, an amount of calculation increases but optimization is properly performed. Therefore, the frequency of repeated performance is determined with consideration of a system performance and complexity.

The SoN server selects n candidate PCID sets in an order of least use from the total of 2n candidate PCID sets in block 506.

When determining not to repeatedly perform in block 502, the SoN server selects at least one candidate PCID set that includes a least number of PCIDs from n candidate PCID sets.

After that, the SoN server ends the present algorithm according to an embodiment of the present invention.

Figure 6:
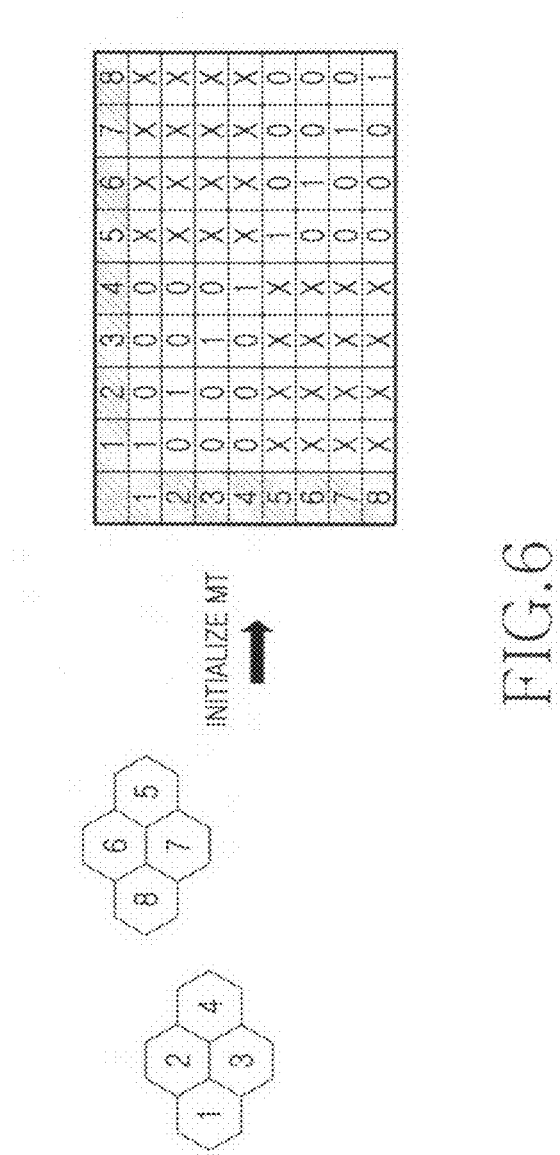
FIG. 6 illustrates MT initialization according to an embodiment of the present invention.

FIG. 6 illustrates an example of MT initialization according to an embodiment of the present invention.

Referring to FIG. 6, the SoN server configures an MT based on GPS position information of femto cells 1 to 8. In one embodiment, a horizontal axis of the MT denotes a femto base station index, and a vertical axis denotes a PCID index. "1" denotes PCID use, "0" denotes PCID use restriction due to PCID use by a neighbor femto cell, and "x" denotes an available PCID.

For example, when femto base stations 1 to 4 are adjacent to each other, and femto base stations 5 to 8 are distant away by more than a predetermined distance, the femto base station 1 uses a PCID corresponding to an index 1, use of PCID indexes 2 to 4 is restricted due to use of the neighbor femto cell, and PCIDs 5 to 8 are reused. This may be represented on the MT by 1000xxxx.

Likewise, the femto base station 2 uses a PCID corresponding to an index 2, use of PCID indexes 1, 3, and 4 is restricted due to use of the neighbor femto cell, and PCIDs 5 to 8 are reused. The femto base station 3 uses a PCID corresponding to an index 3, use of PCID indexes 1, 2, and 4 is restricted due to use of the neighbor femto cell, and PCIDs 5 to 8 are reused. The femto base station 4 uses a PCID corresponding to an index 4, and use of PCID indexes 1 to 3 is restricted due to use of the neighbor femto cell, and PCIDs 5 to 8 are reused.

The femto base station 5 uses a PCID corresponding to an index 5, use of PCID indexes 6 to 8 is restricted due to use of the neighbor femto cell, and PCIDs 1 to 4 are reused. The femto base station 6 uses a PCID corresponding to an index 6, use of PCID indexes 5, 7, and 8 is restricted due to use of the neighbor femto cell, and PCIDs 1 to 4 are reused. The femto base station 7 uses a PCID corresponding to an index 7, use of PCID indexes 5, 6, and 8 is restricted due to use of the neighbor femto cell, and PCIDs 1 to 4 are reused. The femto base station 8 uses a PCID corresponding to an index 8, use of PCID indexes 5, 6, and 7 is restricted due to use of the neighbor femto cell, and PCIDs 1 to 4 are reused.

FIG. 7 illustrates a virtual cell for updating an MT according to an embodiment of the present invention.

Figure 7A:
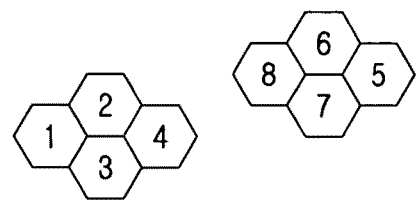
FIGS. 7A-7C illustrate a virtual cell for updating an MT according to an embodiment of the present invention.

Under an environment of FIG. 7A where femto base stations 1 to 4 are adjacent to one another and femto base stations 5 to 8 are distant away by more than a predetermined distance, when the same PCID is allocated to the femto base stations 4 and 8, conditions of collision free and confusion free are met, such that a problem does not occur.

Figure 7B:
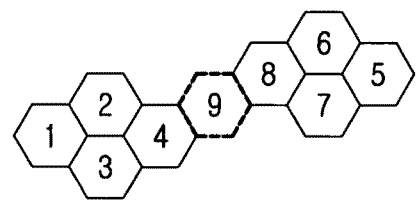

When a femto base station 9 is additionally installed between the femto base station 4 and the femto base station 8 according to FIG. 7B, a confusion problem occurs between the femto base station 4 and the femto base station 8. That is, the femto base station 9 may not discriminate the femto base station 4 and the femto base station 8 that use the same PCID. Therefore, in this situation, one of the two femto base stations needs to change the existing PCID to meet the conditions of collision free and confusion free. Since the change of the existing PCID may generate a disorder to the existing system operation, it should be avoided.

Figure 7C:
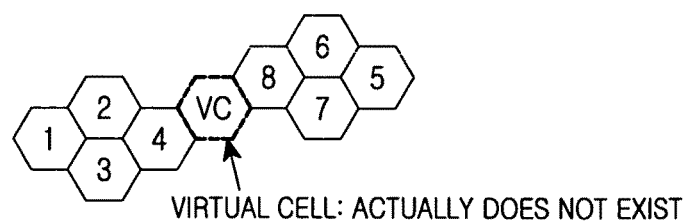

Therefore, according to FIG. 7C, though the real femto base stations 1 to 8 exist in a relevant macro cell region, a virtual cell, that is, a virtual femto base station between the femto base stations 4 and 8 are considered. In other words, when cells with a distance that is close to a cell radius exist among cells marked by 'x' between femto cells in making an initial MT, the initial MT that considers a virtual cell between two cells is made to perform PCID allocation that meets the conditions of collision free and confusion free.

Figure 8:
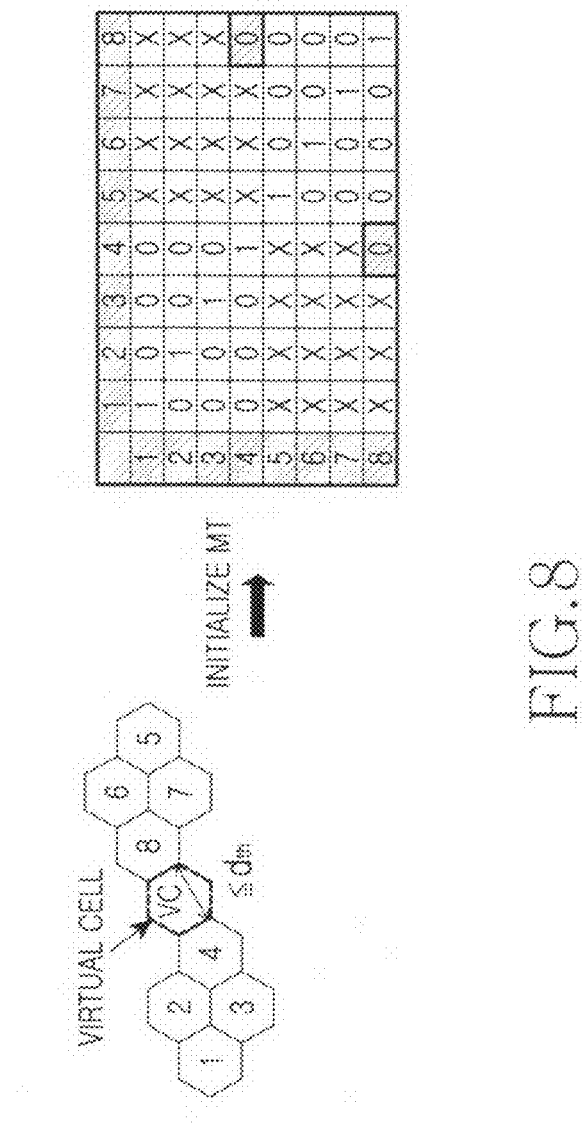
FIG. 8 illustrates updating of an MT according to an embodiment of the present invention.

FIG. 8 illustrates updating of an MT according to an embodiment of the present invention.

Referring to FIG. 8, a SoN server measures a relevant inter-neighbor femto cell distance where MT(c,j)=x in an initial MT using GPS position information. For example, the SoN server selects a femto base station 4, a femto base station 8 where confusion may occur due to installation of a new femto base station (when a virtual cell exists), and measures a distance between the femto base station 4 and the femto base station 8 based on the GPS position information reported by each femto base station. When the distance between the femto base station 4 and the femto base station 8 is equal to or less than a threshold ($d_{th}$), the MT is updated. The existing value of the MT(4,8) is updated from x to 0, and the value of the MT(8,4) is updated from x to 0. That is, though a femto base station 9 is not additionally installed between the femto base station 4 and the femto base station 8, use of a PCID index 4 of the femto base station 8 is restricted and use of a PCID index 8 of the femto base station 4 is restricted with consideration of a virtual cell between the femto base stations 4 and 8. According to the above example, confusion occurrence may be suppressed beforehand by considering a virtual cell.

When the distance between the femto base station 4 and the femto base station 8 is greater than the threshold (dth), MT(4,8) and MT(8,4) are not updated.

Though description has been made with consideration of one virtual cell in FIG. 8, the MT may be updated with consideration of a plurality of virtual cell groups or clusters.

Figure 9:
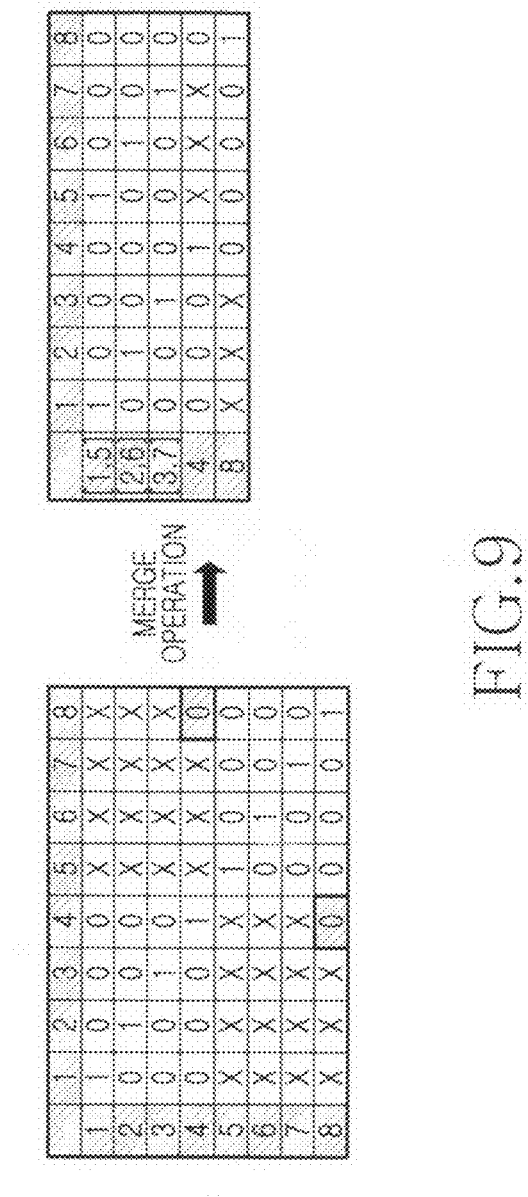
FIG. 9 illustrates reducing of the number of rows of an MT updated according to an embodiment of the present invention.

FIG. 9 illustrates reducing of the number of rows (that is, PCID indexes) of an MT updated according to an embodiment of the present invention.

Referring to FIG. 9, rows of an MT are aligned according to a predefined permutation rule (1,5,2,6,3,7,4,8), such that a plurality of PCIDs are merged. That is, the merging of the plurality of PCIDs denotes determining femto base stations that use the same PCID.

A row-by-row merge rule is given by Equation (1).

$1 \cap X = 1;$ $1 \cap 1 = 1;$ $0 \cap X = 0;$ $0 \cap 0 = 0$ $X \cap X = X;$ and $1 \cap 0 =$ Merge is NOT allowed. [Eqn. 1]

For example, in the MT of FIG. 8, a femto base station 1 merges a PCID 1 and a PCID 5 ($1 \cap X = 1$) according to a permutation rule (1,5,2,6,3,7,4,8). Next, when merging a PCID 1, a PCID 5, and a PCID 2 ($1 \cap X \cap 0 = 0$), since $1 \cap 0$ does not allow merging, the femto base station 1 does not merge a PCID 1, a PCID 5, and a PCID 2. After that, the femto base station 1 merges a PCID 2 and a PCID 6, and merges a PCID 3 and a PCID 7. However, examination of a merging result of a PCID 4 and a PCID 8 shows that since a femto base station 8 does not allow merge of a PCID 4 and a PCID 8, the femto base station 1 does not allow merge of the PCID 4 and the PCID 8.

Consequently, merged row values of the femto base station 1 become (1,5), (2,6), (3,7), 4, and 8. Before a merge operation, eight PCIDs are required, but after the merge operation (that is, after PCID reuse is considered), five PCIDs are required.

Likewise, each of femto base stations 2 to 8 performs a merge operation according to a permutation rule (1,5,2,6,3,7,4,8).

FIG. 9 illustrates an example of a merge operation according to one permutation rule (1,5,2,6,3,7,4,8).

Therefore, a method for optimizing an MT (that is, a method for allocating a least number of PCIDs to a femto base station) applies a permutation rule of all possible situations to select an MT where at least number of PCIDs is designed.

For example, when the number of rows (i.e. number of PCIDs) of an initial MT is n and the number of columns (i.e. number of femto base stations) is m, the number of permutations becomes m! (=m*(m−1)*(m−2) . . . ). In other words, an MT to which a least number of PCIDs is allocated is selected from m! candidate MTs. However, since all permutations have to be considered, an amount of calculation increases.

Considering all permutations may be optimal, but depending upon the situation, a quasi-optimizing method that does not consider all permutations may be used according to FIG. 5. For example, after n permutations are selected from m! (=m*(m−1)*(m−2) . . . ) permutations, an MT is made based on Equation (1) by repeatedly swapping positions of two elements in each permutation.

Figure 10:
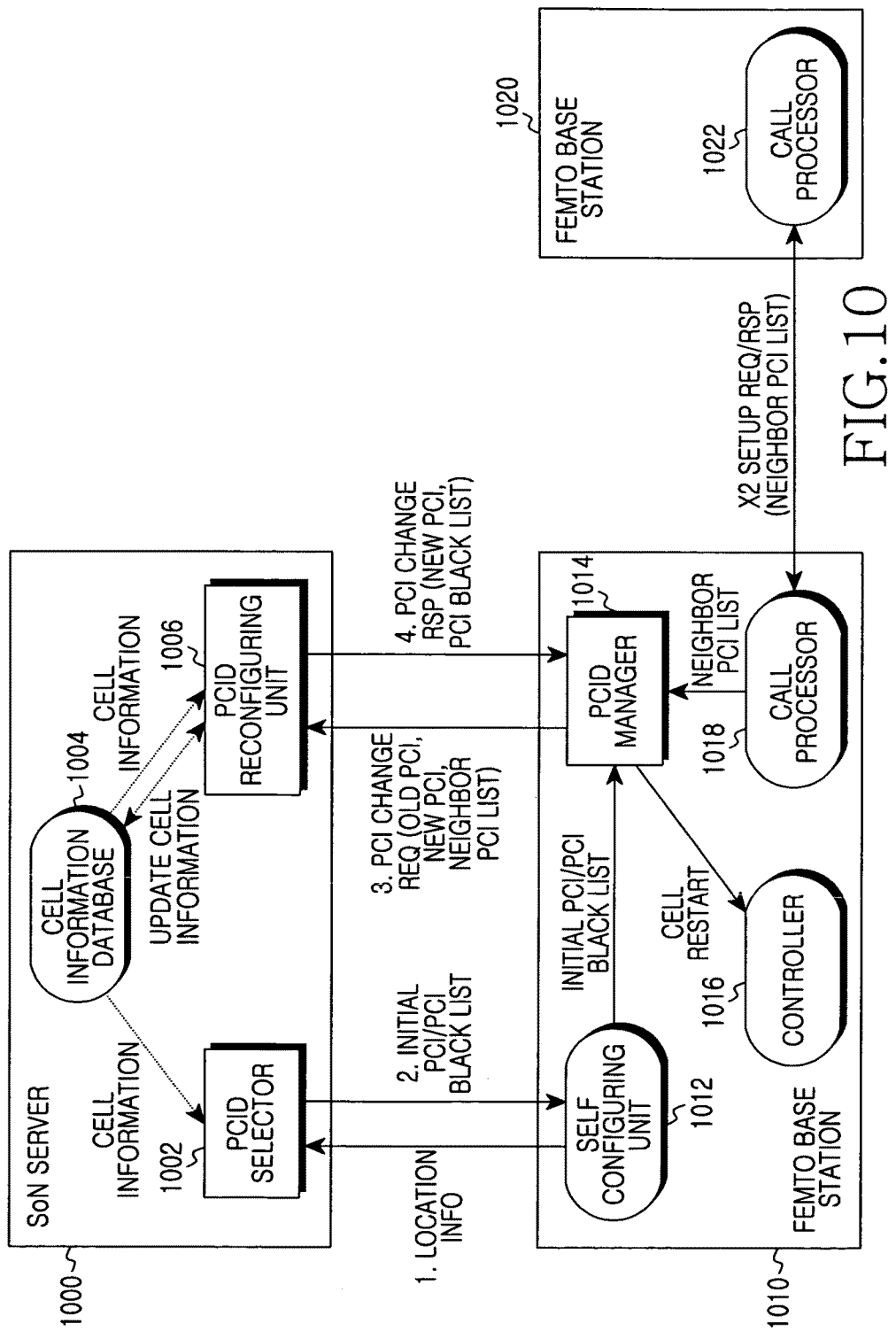
FIG. 10 illustrates a SoN server and a femto base station according to an embodiment of the present invention.

FIG. 10 illustrates a SoN server and a femto base station according to an embodiment of the present invention.

Referring to FIG. 10, the SoN server 1000 includes a cell information database 1004, a PCID selector 1002, and a PCID reconfiguring unit 1006.

The cell information database 1004 obtains and stores position information of a plurality of femto base stations 1010 and 1020, and provides the position information to the PCID selector 1002 and the PCID reconfiguring unit 1006.

The PCID reconfiguring unit 1006 configures an initial MT including allocation information of a PCID based on position information of the femto base stations 1010 and 1020, updates the initial MT with consideration of at least one virtual cell, and minimizes the number of rows and columns in the initial MT. Here, the initial MT includes PCID information allocated to a relevant femto base station, information of a PCID whose use by the relevant femto base station is restricted, and PCID reuse information of the relevant femto base station.

The PCID reconfiguring unit 1006 measures a distance between neighbor femto base stations that can reuse a PCID based on GPS position information, and when the measured distance between the neighbor femto base stations that can reuse the PCID is equal to or less than a threshold, changes a PCID reuse information value of the neighbor femto base stations to information of a PCID whose use is restricted in the initial MT. In addition, when the measured distance between the neighbor femto base stations that can reuse the PCID is greater than the threshold, the PCID reconfiguring unit 1006 does not change the PCID reuse information value of the neighbor femto base stations in the initial MT.

In addition, to minimize the number of rows or columns in the initial MT, the PCID reconfiguring unit 1006 aligns the rows or columns in the initial MT according to a plurality of predefined permutation rules, swaps at least two elements of rows or columns in a plurality of the aligned initial MTs to merge rows or columns in the initial MT, and selects a row or a column of at least one MT that includes a least number of rows or columns from the plurality of merged initial MTs. The PCID reconfiguring unit 1006 swaps at least two elements in a row or a column of the plurality of aligned initial MTs to merge a row or a column of the initial MT, and repeatedly perform by a predetermined number of times selecting a row or a column of at least one initial MT that includes a least number of rows or columns from the plurality of merged initial MTs.

When optimizing the cell identifier allocation as a topology by a new femto cell changes, the PCID selector 1002 allocates a PCID using an MT. When not optimizing the cell identifier allocation, the PCID selector 1002 selects one of available PCIDs and allocates the same.

The femto base station 1010 includes a self configuring unit 1012, a PCID manager 1014, a controller 1016, and a call processor 1018.

The controller 1016 receives PCID information from the PCID manager 1014 to perform an overall control of the femto base station 1010.

The self configuring unit 1012 provides position information to the SoN server 1000, and receives an initial PCID/PCID black list from the SoN server 1000 to generate installation parameters corresponding to an inner construction of the base station in itself, and performs base station initial automatic installation and operations of identifying a neighbor base station, relation setting/registration, and connection settings with a core network in a pre-operation process.

The PCID manager 1014 requests the SoN server 1000 to change a PCID including an old PCID, a new PCID, and neighbor PCID list information, and receives a response to the PCID change including a new PCID and a PCID black list from the SoN server 1000.

The call processor 1018 exchanges a neighbor PCID list by exchanging an X2 setup request/response message via an X2 interface with a call processor 1022 of the neighbor femto base station 1020. In addition, the call processor 1018 provides a neighbor PCID list obtained from the neighbor femto base station 1020 to the PCID manager 1014.

As described above, a self-organizing network may efficiently allocate a PCID by using an MT for PCID allocation. In addition, an algorithm for optimized PCID allocation does not need to be performed whenever a femto cell is installed or removed.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for configuring a Merge Table (MT) for allocating a cell identifier in a self-organizing network (SoN), the method comprising:

obtaining position information of a plurality of femto base stations;

configuring the MT including allocation information of a plurality of Physical Cell Identifiers (PCIDs) based on the position information of the each femto base station; and minimizing a number of rows in the MT according to at least one permutation set, each row of the MT representing a PCID index.

2. The method of claim 1, wherein a column of the MT represents a femto base station index.

3. The method of claim 1, wherein the allocation information of a PCID in the MT indicates at least one of allocation of the PCID to a relevant femto base station, restriction of the PCID from the relevant femto base station, and reusability of the PCID by the relevant femto base station.

4. The method of claim 1, further comprising updating the MT with consideration of at least one virtual cell.

5. The method of claim 4, wherein updating the MT comprises:

determining a distance between neighbor femto base stations where confusion may occur due to the at least one virtual cell; and when the determined distance between the neighbor femto base stations is equal to or less than a threshold, changing the allocation information of the PCIDs for each neighbor femto base station to indicate restriction of the each others' PCID in the MT, wherein changing the allocation information of the PCIDs for each neighbor femto base station to indicate restriction of the each others' PCID comprises:

changing the allocation information of the PCIDs associated with a second neighbor femto base station for a first neighbor femto base station to indicate restriction of the each others' PCID and changing the allocation information of the PCIDs associated with the first neighbor femto base station for the second neighbor femto base station to indicate restriction of the each others' PCID.

6. The method of claim 5, further comprising, when the determined distance between the neighbor femto base stations where the PCID is reusable is greater than the threshold, not changing the allocation information of the neighboring PCIDs in the MT.

7. The method of claim 1, wherein minimizing the number of the row in the MT according to the at least one permutation set comprises merging two rows in an order of permutation of the at least one permutation set using a first equation below:

$$MO(MO(MO(c_1,c_2),c_3),c_4)\ldots c_k),$$

where MO denotes an operation that merges two rows according to a second equation below, and $c_k$ denotes a permuted k-th row:

$1 \cap X = 1,$ $1 \cap 1 = 1,$ $0 \cap X = 0,$ $0 \cap 0 = 0,$ $X \cap X = X,$ and $1 \cap 0 = $ Merge is not allowed, where "1" indicates a PCID is allocated to a present femto base station, "0" indicates a PCID is restricted due to allocation to a neighbor femto base station, and "X" indicates a PCID is reusable.

8. The method of claim 7, further comprising:

swapping at least two elements in each of n permutation sets, where n is the number of permutation set; and selecting a predetermined permutation set from 2n permutation sets.

9. The method of claim 1, wherein each permutation comprises a set of k columns or rows of the MT.

10. The method of claim 1, wherein a unique PCID in the MT is allocated to each femto base station.

11. A method for allocating a cell identifier in a self-organizing network, the method comprising:

when topology is changed by a new femto cell, determining whether to optimize cell identifier allocation;

when optimizing the cell identifier allocation, allocating a Physical Cell Identifier (PCID) using a Merge Table (MT), the MT comprising allocation information of a plurality of PCIDs based on position information of a plurality of femto base stations; and when not optimizing the cell identifier allocation, selecting and allocating an available PCID.

12. The method of claim 11, further comprising configuring the MT, wherein configuring the MT comprises:

obtaining the position information of the plurality of femto base stations;

configuring the MT comprising the allocation information of the plurality of PCIDs based on the position information of the femto base stations; and minimizing a number of rows in the MT according to at least one permutation, each row of the MT representing a PCID index.

13. The method of claim 12, wherein a column of the MT represents a femto base station index.

14. The method of claim 12, wherein the allocation information of a PCID in the MT indicates at least one of allocation of the PCID to a relevant femto base station, restriction of the PCID from the relevant femto base station, and reusability of the PCID by the relevant femto base station.

15. The method of claim 12, further comprising updating the initial MT with consideration of at least one virtual cell, wherein updating of MT comprises:

determining a distance between neighbor femto base stations where confusion may occur due to the at least one virtual cell; and when the determined distance between the neighbor femto base stations is equal to or less than a threshold, changing the allocation information of the PCIDs for each neighbor femto base station to indicate restriction of the each others' PCID in the MT, wherein changing the allocation information of the PCIDs for each neighbor femto base station to indicate restriction of the each others' PCID comprises:

changing the allocation information of the PCIDs associated with a second neighbor femto base station for a first neighbor femto base station to indicate restriction of the each others' PCID and changing the allocation information of the PCIDs associated with the first neighbor femto base station for the second neighbor femto base station to indicate restriction of the each others' PCID.

16. The method of claim 15, further comprising, when the determined distance between the neighbor femto base stations where the PCID is reusable is greater than the threshold, not changing the allocation information of the neighboring PCIDs in the MT.

17. The method of claim 12, wherein minimizing the number of rows according to the at least one permutation set in the MT comprises merging two rows in an order of permutation of the at least one permutation set using a first equation below:

$$MO(MO(MO(c_1,c_2),c_3),c_4)\ldots c_k),$$

where MO denotes an operation that merges two rows according to a second equation below, and $c_k$ denotes a permuted k-th row:

$1 \cap X = 1,$ $1 \cap 1 = 1,$ $0 \cap X = 0,$ $0 \cap 0 = 0,$ $X \cap X = X,$ and $1 \cap 0 = $ Merge is not allowed, where "1" indicates a PCID is allocated, "0" indicates a PCID is restricted, and "X" indicates a PCID is reusable.

18. The method of claim 17, further comprising:

swapping at least two elements in each of n permutation sets, where n is the number of permutation set; and selecting a predetermined permutation set from 2n permutation sets.

19. The method of claim 12, wherein each permutation comprises a set of k columns or rows of the MT.

20. The method of claim 12, wherein a unique PCID in the MT is allocated to each femto base station.

21. An apparatus for configuring a Merge Table (MT) for allocating a cell identifier in a self-organizing network, the apparatus comprising:
a database configured to obtain and store position information of a plurality of femto base stations; and
a Physical Cell Identifier (PCID) reconfiguring unit configured to configure an MT including allocation information of a plurality of PCIDs based on the position information of the femto base stations, and minimize a number of rows in the MT according to at least one permutation, each row of the MT representing a PCID index.

22. The apparatus of claim 21, wherein a column of the MT represents a femto base station index.

23. The apparatus of claim 21, wherein allocation information of a PCID in the MT indicates at least one of allocation of the PCID to a relevant femto base station, restriction of the PCID by the relevant femto base station, and reusability of the PCID by the relevant femto base station.

24. The apparatus of claim 21, wherein the PCID reconfiguring unit updates the MT with consideration of at least one virtual cell.

25. The apparatus of claim 24, wherein when updating the MT with consideration of the at least one virtual cell, the PCID reconfiguring unit determines a distance between neighbor femto base stations where confusion may occur due to the at least one virtual cell and, when the determined distance between the neighbor femto base stations where the PCID is reusable is equal to or less than a threshold, changing the allocation information of the PCIDs for each neighbor femto base station to indicate restriction of the each others' PCID, in the MT,
wherein the PCID reconfiguring unit changes the allocation information of the PCIDs associated with a second neighbor femto base station for a first neighbor femto base station to indicate restriction of the each others' PCID and changes the allocation information of the PCIDs associated with the first neighbor femto base station for the second neighbor femto base station to indicate restriction of the each others' PCID.

26. The apparatus of claim 25, wherein when the determined distance between the neighbor femto base stations where the PCID is reusable is greater than the threshold, the PCID reconfiguring unit does not change the allocation information of the neighboring PCIDs in the MT.

27. The apparatus of claim 21, wherein when minimizing the number of rows in the MT according to the at least one permutation set, the PCID reconfiguring unit merges two rows in an order of permutation of the at least one permutation set using a first Equation below:

$$MO(MO(MO(MO(c_1,c_2),c_3),c_4)\ldots c_k),$$

where MO denotes an operation that merges two rows according to a second equation below, and $c_k$ denotes a permuted k-th row:

$$1 \cap X = 1,$$

$$1 \cap 1 = 1,$$

$$0 \cap X = 0,$$

$$0 \cap 0 = 0,$$

$$X \cap X = X, \text{ and}$$

$$1 \cap 0 = \text{Merge is not allowed,}$$

where "1" indicates a PCID is allocated to a present femto base station, "0" indicates a PCID is restricted due to allocation to a neighbor femto base station, and "X" indicates a PCID is reusable.

28. The apparatus of claim 27, wherein the PCID reconfiguring unit swaps at least two elements in each of n permutation sets, where n is the number of permutation set, and selects a predetermined permutation set from 2n permutation sets.

29. The apparatus of claim 21, wherein each permutation comprises a set of k columns or rows of the MT.

30. The apparatus of claim 21, wherein a unique PCID in the MT is allocated to each femto base station.

31. The apparatus of claim 24, wherein when minimizing the number of rows according to the at least one permutation set in the MT, the PCID reconfiguring unit merges two rows in an order of permutation of the at least one permutation set using a first equation below:

$$MO(MO(MO(MO(c_1,c_2),c_3),c_4)\ldots c_k),$$

where MO denotes an operation that merges two rows according to a second equation below, and $c_k$ denotes a permuted k-th row:

$$1 \cap X = 1,$$

$$1 \cap 1 = 1,$$

$$0 \cap X = 0,$$

$$0 \cap 0 = 0,$$

$$X \cap X = X, \text{ and}$$

$$1 \cap 0 = \text{Merge is not allowed,}$$

where "1" indicates a PCID is allocated, "0" indicates a PCID is restricted, and "X" indicates a PCID is reusable.

32. The apparatus of claim 31, wherein the PCID reconfiguring unit swaps at least two elements in each of n permutation sets, where n is the number of permutation set, and selects a predetermined permutation set from 2n permutation sets.

33. An apparatus for allocating a cell identifier in a self-organizing network, the apparatus comprising:
a controller configured to determine whether to optimize cell identifier allocation when topology by a new femto cell changes; and
a Physical Cell Identifier (PCID) selector configured to allocate a PCID using a Merge Table (MT) when optimizing the cell identifier allocation, and select and allocate an available PCID when not optimizing the cell identifier allocation,
wherein the MT comprises allocation information of a plurality of PCIDs based on position information of a plurality of femto base stations.

34. The apparatus of claim 33, further comprising a PCID reconfiguring unit configured to:
obtain the position information of the plurality of femto base stations from a database,
configure the MT that includes the allocation information of the plurality of PCIDs based on the position information of the femto base stations, and
minimize a number of rows in the MT according to at least one permutation, each row of the MT representing a PCID index.

35. The apparatus of claim 34, wherein a column of the MT represents a femto base station index.

36. The apparatus of claim 34, wherein the allocation information of a PCID in the MT indicates at least one of allocation of the PCID to a relevant femto base station, restriction of the PCID from the relevant femto base station, and reusability of the PCID by the relevant femto base station.

37. The apparatus of claim 34, wherein the PCID reconfiguring unit is further configured to update the MT with consideration of at least one virtual cell by:
   determining a distance between neighbor femto base stations where confusion may occur due to the at least one virtual cell based on Global Positioning System (GPS) position information, and
   changing the allocation information of the PCID for each neighbor femto base station to indicate restriction of the each others's PCID in the MT, when the determined distance between the neighbor femto base stations is equal to or less than a threshold,
   wherein the PCID reconfiguring unit changes the allocation information of the PCIDs associated with a second neighbor femto base station for a first neighbor femto base station to indicate restriction of the each others' PCID and changes the allocation information of the PCIDs associated with the first neighbor femto base station for the second neighbor femto base station to indicate restriction of the each others' PCID.

38. The apparatus of claim 37, wherein when the determined distance between the neighbor femto base stations where the PCID is reusable is greater than the threshold, the PCID reconfiguring unit does not change the allocation information of the neighboring PCIDs in the MT.

39. The apparatus of claim 34, wherein each permutation comprises a set of k columns or rows of the MT.

40. The apparatus of claim 34, wherein a unique PCID in the MT is allocated to each femto base station.

* * * * *